United States Patent [19]

Randle

[11] Patent Number: 4,905,172

[45] Date of Patent: Feb. 27, 1990

[54] METHOD OF GENERATING AND TRANSMITTING DIGITALLY DISTORTED TEST SIGNALS

[75] Inventor: William C. Randle, Bend, Oreg.

[73] Assignee: Tektronix, Inc., Beaverton, Oreg.

[21] Appl. No.: 222,460

[22] Filed: Jul. 21, 1988

[51] Int. Cl.$^4$ ............................ G06F 7/06; G06F 3/09
[52] U.S. Cl. ..................................... 364/580; 371/20; 371/27
[58] Field of Search ................ 364/579, 580; 340/514; 178/80, 81, 69 A; 371/27, 28, 20, 64; 375/60; 332/18, 37 R; 307/600, 601

[56] References Cited

U.S. PATENT DOCUMENTS

| | | | |
|---|---|---|---|
| 3,526,713 | 6/1966 | Elvis et al. ........................ | 178/69 N |
| 4,538,268 | 8/1985 | Van Cang .............................. | 371/27 |
| 4,656,428 | 4/1987 | Ishikawa .............................. | 84/1.24 |
| 4,692,920 | 9/1987 | Tannhaeuser et al. ................ | 371/27 |

OTHER PUBLICATIONS

Stelma Communications PG-303 Pattern Technical Manual, pp. 29-52.
Tektronix, Inc. 834 Progammable Data Communications (Tester Instruction Manual, pp. 4-1 to 4-2 and Block Diagram).
"Circuit for Forming Test Message for Testing Serial Data Link" IBM Technical Disclosure Bulletin, Aug. 1983, vol. 28, No. 3, p. 1012.
Tektronix, Inc. 835/836 Programmable Data Communications (Tester Instruction Manual, pp. 13-1 to 13-2 and Block Diagram).
Tektronix, Inc. 834R03A Link Test ROM Pack (pp. 2-1 to 2-8).

Primary Examiner—Felix D. Gruber
Attorney, Agent, or Firm—William K. Bucher

[57] ABSTRACT

A microprocessor controlled test system generates and transmits distorted digital signals to a system under test by expanding a bit pattern, representative of a character to be transmitted, by an integer multiple of expansion. Selected bits of the expanded bit pattern are toggled from one logic level to another under program control to produce a distorted expanded bit pattern. The distorted expanded bit pattern is clocked out of the test system to the system under test at a rate equal to the integer multiple of expansion times the baud rate of the system under test. The resolution of the test signal can be varied by changing the integer multiple of expansion along with the rate at which the test signal is clocked out of the test system. The invention is useful in testing and adjusting a teletypewriter.

5 Claims, 5 Drawing Sheets

1% MARK-BIAS DISTORTION

METHOD OF GENERATING AND TRANSMITTING DIGITALLY DISTORTED TEST SIGNALS

BACKGROUND OF THE INVENTION

The present invention relates generally to digital signal generation and more specifically to the generation of digital distortion signals for testing teletypewriters.

In older style teletypewriter systems, printed characters are produced in response to a digital signal, representative of alphanumeric characters, driving a mechanical cam in the teletypewriter. Too much distortion in the digital signal has an adverse effect on the quality of the printed output. To insure a quality printed output, a known amount of distortion is added to the digital signal, for example 30% distortion, and sent to the teletypewriter. The cam is adjusted until the printed character starts to deteriorate. The cam position is marked and the cam is rotated in the opposite direction until the printed character starts to deteriorate again. This position is marked. The cam is then positioned midway between the end points where the printed outputs started to deteriorate.

Traditional methods of generating distortion in teletypewriter digital signals have relied heavily on discrete logic circuits and components to modify a known pattern by a fixed percentage of distortion. The Stelma Telecommunications PG-303A Pattern Generator is an example of a product using such a method. In the PG-303A, front panel controls and switches are used to set-up the instrument to produce various types of output signals at selected baud rates that are to be transmitted to a system under test. The instrument can be set-up to run in synchronous mode where a character pattern is continuously transmitted or in start-stop mode where a release button must be depressed on the front panel to allow a single bit pattern to be transmitted. In addition, either distorted patterns or "true-time" patterns, ones without distortion, can be generated.

To generate and transmit a selected character bit pattern output from the PG-303A, the operator must first manually select the bit pattern to be sent by depressing selected switches of the select character switch matrix on the front panel. The selected bit pattern is loaded into a signal pattern matrix. The bit pattern in the switch pattern matrix is then loaded in parallel format into an eleven stage data register of a character distributor and timing control circuit. The character distributor and timing control circuit converts the parallel data into serial data and outputs it to a data output circuit to be sent to the system under test.

A time base circuit is provided in the instrument to produce clock pulses that are one hundred times the baud rate selected by the operator. The output of the time base circuit is coupled to decade counters in a distortion generator circuit which furnishes time-controlled shift pulses that are used to clock character bits out of the data register of the character distribution and timing control circuit. The decade counter is coupled to a BCD-to-decimal decoder which in combination with the decade counter counts uniformly from 1 to 100, then recycles and repeats the count. The "true-time" or zero distortion transitions coincide with the zero count condition of the counter. The BCD-to-decimal counter is coupled to a "true-time" shift pulse gating network and a early-late shift pulse gating network consisting of front panel switches, logic gates, and flip-flops. The early-late shift pulse gating network develops an early or late shift pulse in response to the front panel switch settings and the units and tens output of the BCD-to decimal counter. The early-late shift pulse clocks the shift register in the character distribution and timing control circuit to output a bit having a percentage of distortion equal to the front panel control settings to the output control circuit.

The early-late shift pulse gating network and the "true-time" shift pulse gating network are controlled by a distortion control flip-flop in the distortion generator circuit that enables either one or the other of the networks. The "true-time" pulses are derived from the zero outputs of the BCD-to-decimal decoder. The selection of the "true-time" versus distortion is determined by sampling the state of the next to last stage of the data register for a mark or a space. Sampling of this stage is necessary to provide the information needed to select a distorted or non-distorted shift pulse.

Character bit patterns are loaded into the data register when an "all space" condition exists in each stage of the register. This occurs in the start-stop mode when the last mark of the start-stop character has been shifted out of the register. In synchronous operation where a bit pattern is continuously loaded into the data register, an "indicator mark" must be added at the end of each group of data bits to signify that the last bit of the synchronous character is in the last stage of the register and is thus being transmitted.

More recently, microprocessor controlled test equipment has been developed for the teletypewriter industry. The Tektronix 834 Communications Network Analyzer with an associated 834R03A ROM Pack is an example of such a product. The 834R03A ROM Pack contains software that configures the 834 for analysis of serially transmitted digital data from a teletypewriter. Under program control, the 834 receives the serially transmitted data and samples it at a substantially higher rate than the baud rate of the system under test, for example one hundred times the baud rate. The sampled data is stored in RAM and delivered to the microprocessor where the number of zeros and ones are counted. The difference between the actual number of zero or one bits and the higher sample rate, in this case 100, represents the amount of distortion in percent. Bias distortion, isochronous distortion, and start/stop distortion can be analyzed in this manner.

What is needed is a method for generating and transmitting various types of distortion on a digital signal in a microprocessor based instrument without adding a large number of discrete logic circuits to the existing hardware in the instrument. In addition, the method should not require the sampling of the contents of a data register containing the character pattern to be transmitted and feeding back the contents to the distortion generating circuits to establish a distorted on non-distorted output as is done in the prior art. Further, the new method should be capable of implementing a variety of test set-ups without having to insert an "indicator mark" at the end of each group of data bits for controlling the operation of the instrument.

SUMMARY OF THE INVENTION

In a microprocessor controlled test system, a method of generating and transmitting a distorted digital signal is disclosed. Under software control the microprocessor produces a bit pattern, representative of data to be sent to a system under test, such as a teletypewriter, and stores the pattern in a RAM memory. Each bit of the initial pattern is expanded by an integer multiple, such as one hundred, to create an expanded bit pattern which is stored in the RAM. Selected bits of the expanded bit pattern are toggled to produce a distorted bit pattern which is read out of the RAM memory in parallel format and clocked through a parallel to serial converter at a rate equal to the pre-selected baud rate times the integer multiple of expansion. Signal resolution can be varied by changing the integer multiple of expansion and the rate at which the signal is clocked out to the system under test. Under software control, the operator may select any number of bit patterns to be transmitted, the type of distortion to be added, and the baud rate at which the test system will transmit at.

The objects, advantages and novel features of the present invention are apparent from the following detailed description when read in conjunction with the appended claims and attached drawings.

DETAILED DESCRIPTION

Figure 1:
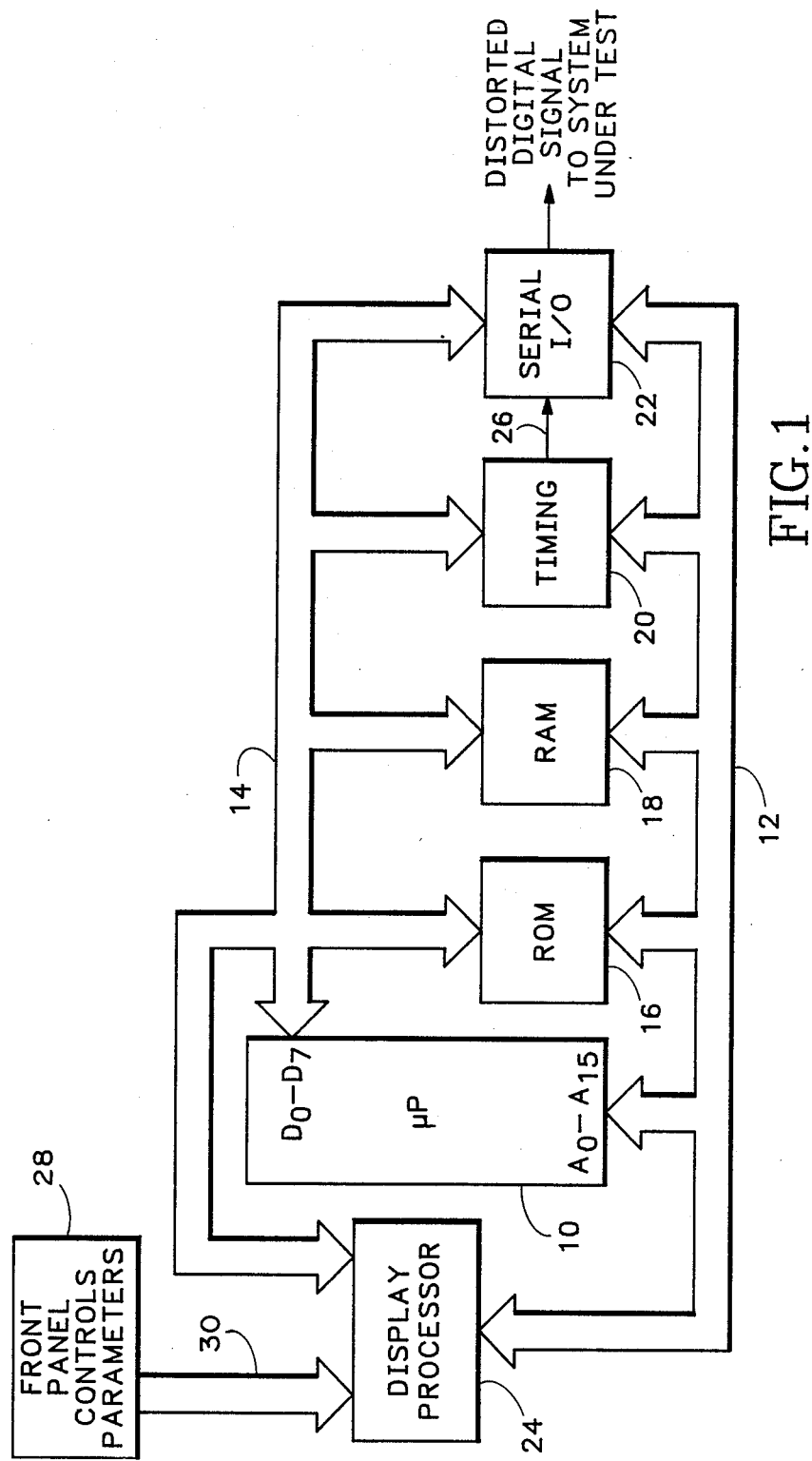
FIG. 1 shows a simplified block diagram of the microprocessor controlled test system of the present invention.

Referring to FIG. 1, there is shown a simplified block diagram of a microprocessor controlled test system, such as is incorporated in the 835 Data Communications Analyzer with a 835R08 Teletypewriter ROM Pack sold by Tektronix, Inc., and used for generating and transmitting a distorted digital signal to a system under test. The test system includes a microprocessor 10, such as a Z80A manufactured by Zilog, Corp. Microprocessor 10 is connected to blocks 16, 18, 20, 22, and 24 via a sixteen line address bus 12 and an eight line data bus 14. Control lines and associated circuits are not shown but are well known to those with experience in circuit design using microprocessors. ROM 16 contains compiled "C" and assembler microcode for controlling the functions of the test system that generate and transmit the distorted digital signal to a system under test. RAM 18 stores data generated by microprocessor 10 and data received from the system under test. Timing block 20 contains programmable timing circuits which under CPU control establish the rate at which data is clocked out of the Serial I/O 22. The Serial I/O 22 receives clock pulses from timing block 20 via line 26 and parallel data from RAM 18 on data bus 14. The clock pulses synchronize the conversion of the parallel data to a serial format and the transmission of the serial data to the system under test. Parameters selected via the front panel controls 30 are monitored by the display processor 24 via data lines 30 and sent via the data bus 14 upon request by microprocessor 10 for generating and transmitting various types of distorted digital signals.

To generate and transmit a distorted digital signal to a system under test, such as a teletypewriter, an operator enters the test system parameters and input data representative of a character to be generated via the front panel controls. The outputs of the front panel controls are passed to microprocessor 10 via display processor 24 which generates a bit pattern representative of the input data to be sent and stores the bit pattern in RAM 18. Microprocessor 10, under program control, then expands each bit of the original bit pattern by an integer multiple, such as one hundred, and writes the expanded bit pattern in RAM 18 eight bits at a time. Based on the parameters selected by the operator, selected bits of the expanded bit pattern are toggled to create a distorted expanded bit pattern. This distorted expanded bit pattern is read out of RAM 18 eight bits at a time via the eight bits line parallel bus 14 to the serial I/O 22. The serial I/O 22, receiving clock pulses from timing block 20 via line 26, synchronizes the conversion of the eight bit parallel data to serial data and the clocking of the data out to the system under test at a rate equal to the baud rate parameter set by the operator times the integer multiple of expansion.

Figure 2:
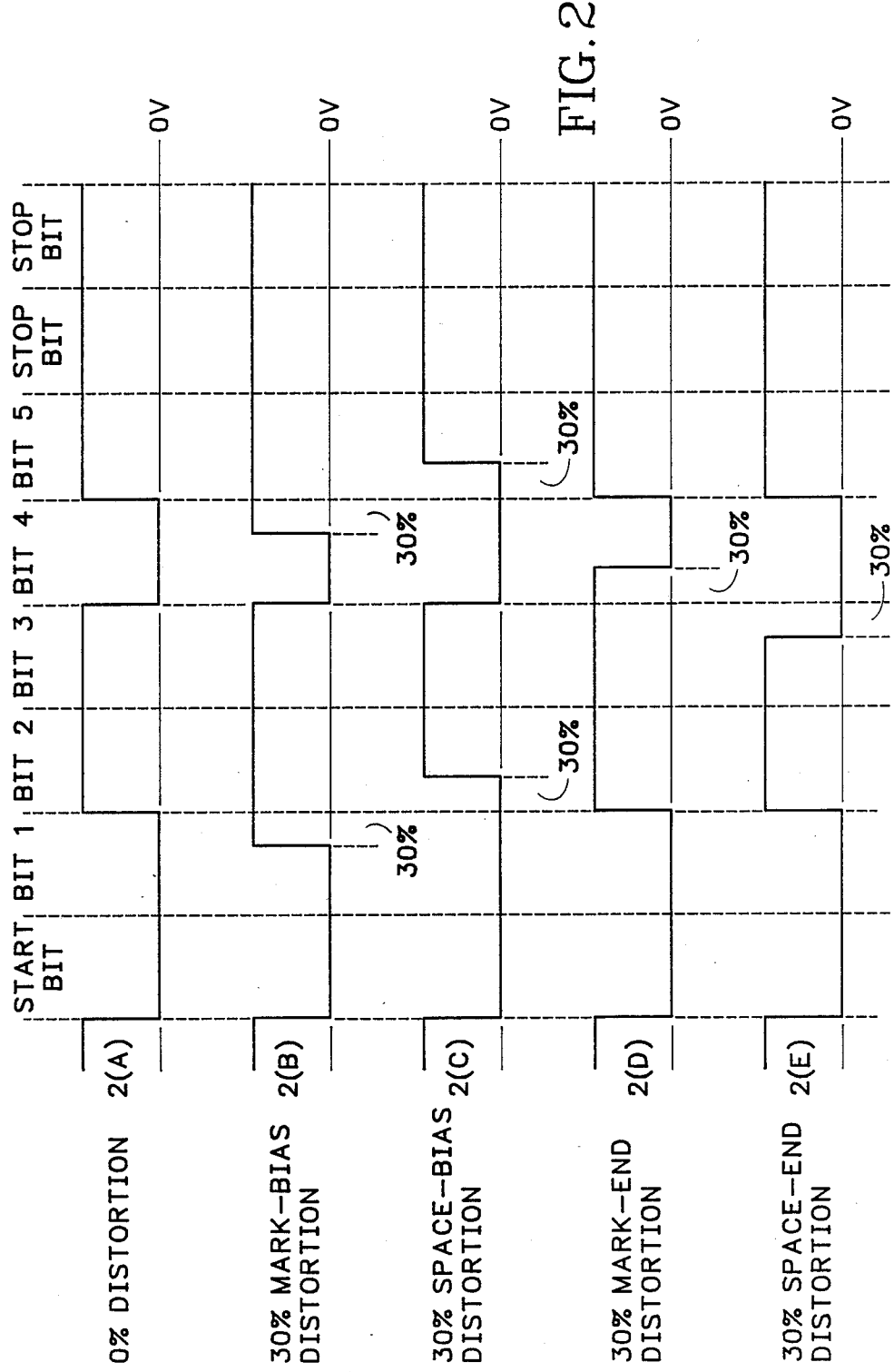
FIGS. 2A-2E are representative waveform diagrams showing various types of distortion signals generated for a teletypewriter.

In the preferred embodiment of the invention, the distorted digital signal, representative of a character to be sent to a teletypewriter, is generated and transmitted. In a teletypewriter environment, the baud rate is generally between 37.5 and 110 bits/sec. A pattern of five bits is used to generate characters on the printer. In asynchronous communications, a single start bit is added at the beginning of each five bit character and two stop bits are added at the end of each character. Referring to FIG. 2(A) there is shown a waveform diagram of a representative digital signal that is sent to a teletypewriter. The eight bit signal contains a start bit, a five bit pattern representative of a character, and two stop bits. FIGS. 2(B)-2(E) show the same digital waveform as in FIG. 2(A) with various types of distortion added. By convention, the various types of distortion have been given descriptive names. BIAS is taken to mean the distortion is occurring on the space-to-mark transitions, i.e. low to high logical transitions, and END is taken to mean the distortion is occurring on the mark-to-space transitions, i.e. high to low logical transitions. MARK indicates that the 0's preceding or trailing the transition are to be toggled and SPACE indicates that the 1's preceding or trailing the transition are to be toggled. As implemented in the preferred embodiment, distortion can be applied to the trailing edge of the start bit but not to the leading edge. In FIG. 2(B) 30% MARK-BIAS distortion has been added to the signal which causes the space-to-mark to lead the non-distorted signal by 30%. In FIG. 2(C) 30% SPACE-BIAS distortion has been added to the signal which causes the space-to-mark transitions to lag the non-distorted signal by 30%. In FIG. (2D) 30% MARK-END distortion has been added which causes the mark-to-space transition to lag by 30%. Note that the start bit mark-to-space transition has not been distorted. In FIG. 2(E) 30% SPACE-END distortion has been added with a 30% lead in the mark-to-space transitions. Combinations of space-to-mark and mark-to-space distortions can also be added to the the digital signal to be sent to the teletypewriter.

Figure 3A:
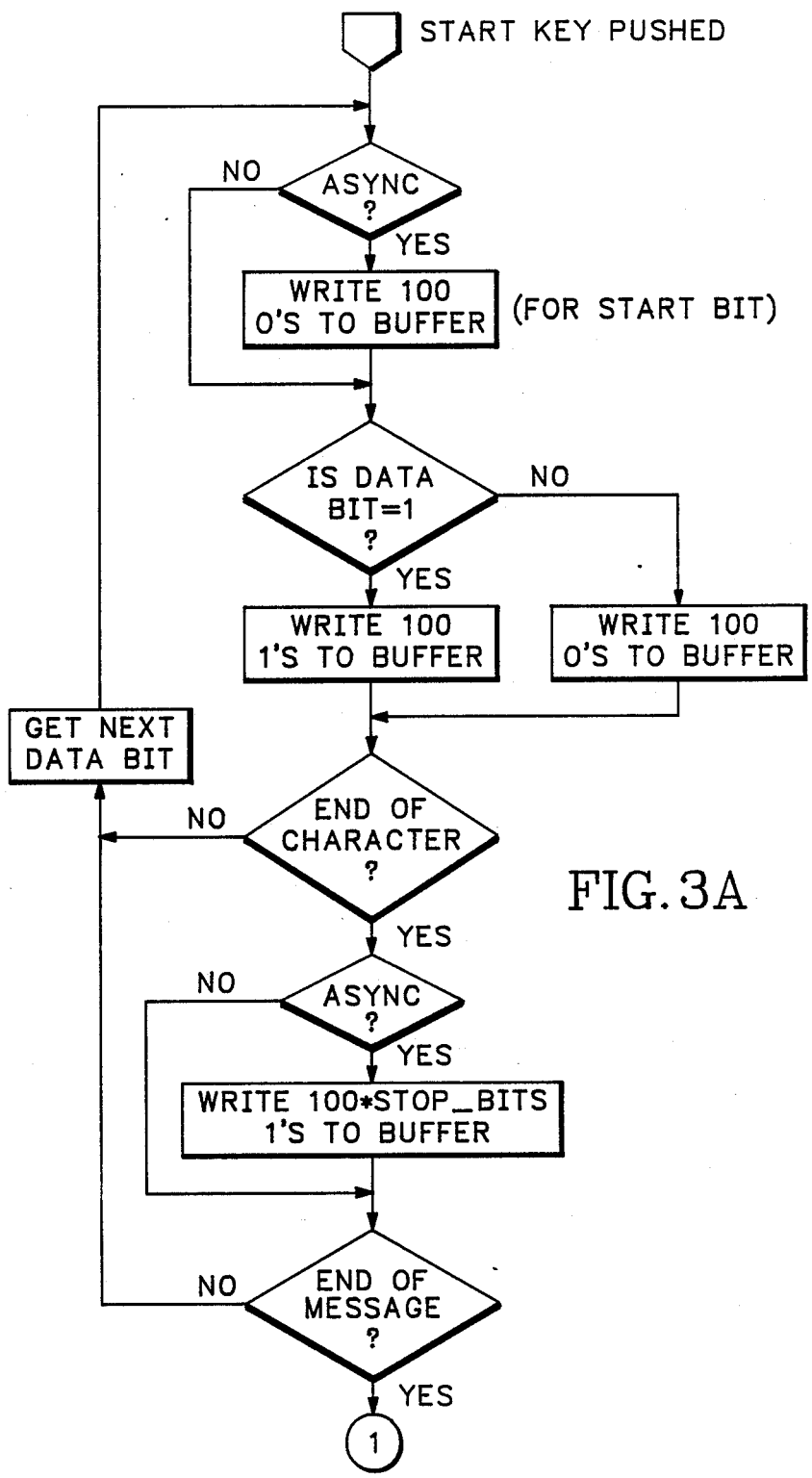
FIG. 3A is a flow chart for expanding a bit pattern by an integer multiple.

Referring to FIG. 3(A), there is shown a flow chart for the microcode stored in ROM 16 that expands a binary character by an integer multiple, as is represented in the flow chart by the value 100. In particular, the flow chart is directed to expanding the bit pattern representative of a character that is to be sent to a teletypewriter. The flow chart shows, when in asynchronous communications the generation of 100 0's for the start bit and a loop routine for expanding each of the 0's and 1's of the five bit character pattern by 100. After each bit of the character is expanded, 1's are written to the buffer equal to 100 times the number of stop bits required. In asynchronous communications with a teletypewriter, there are two stop bits at the end of each character. A loop routine is included to repeat the above steps if more that one character bit pattern is to be sent. In synchronous communications, the five bit character pattern is expanded by the integer multiple without the addition of the start and stop bits.

Figure 3B:
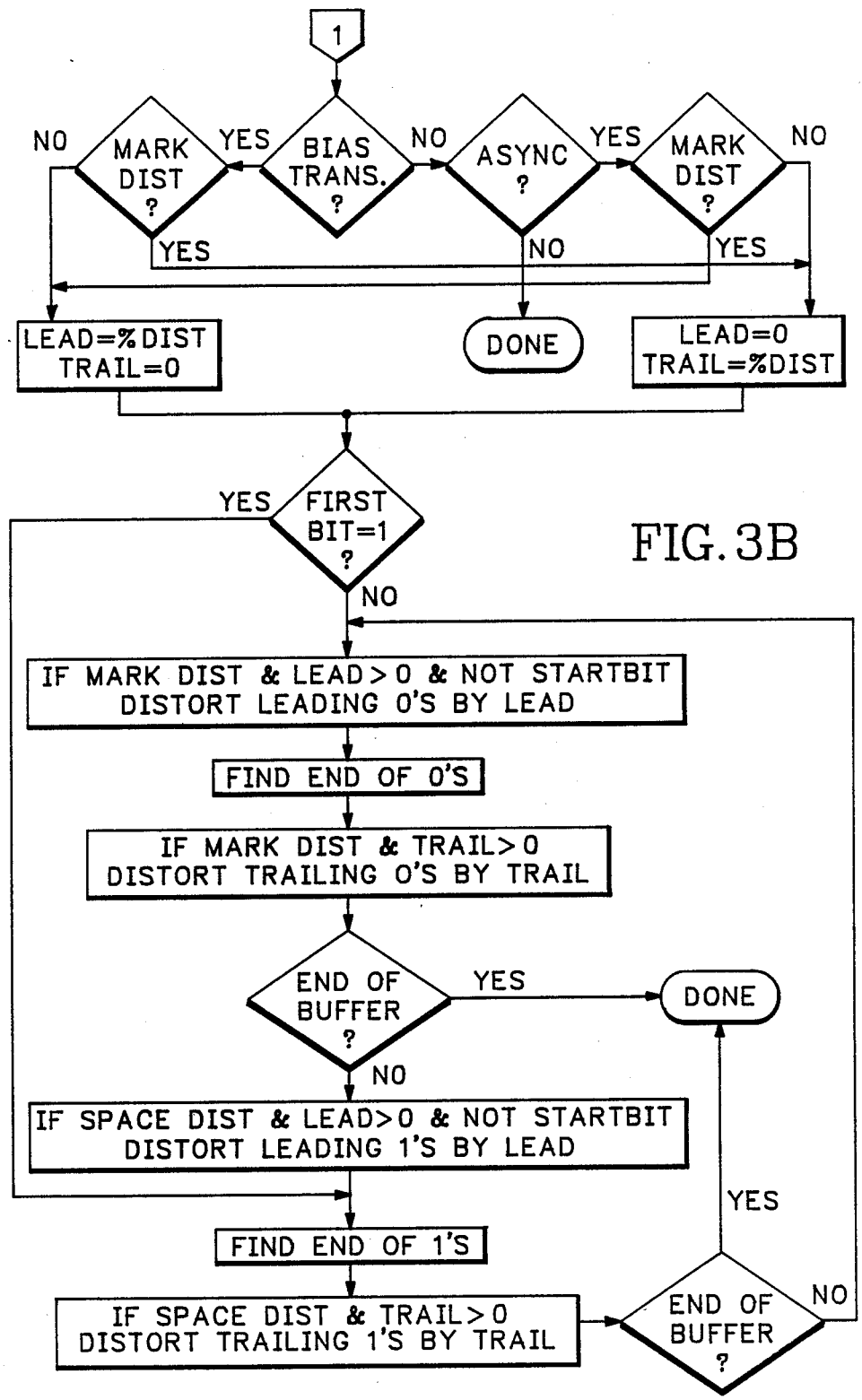
FIG. 3B is a flow chart for adding distortion to an expanded bit pattern.

FIG. 3(B) is a continuation of the flow chart of FIG. 3(A) showing the steps in applying various amounts of distortion to the expanded bit patterns. As was previously described, leading and lagging distortion can be added to the space-to-mark and the mark-to-space transitions with the noted exception of the leading transition of the start bit in asynchronous communications. In addition, a character starting with a logical 1 will not be distorted in synchronous communications. The flow chart shows the decision flow of the microcode in determining which bits of the expanded bit pattern are to be toggled to establish a particular type and amount of distortion. As is shown in the flow chart, distortion is not added to END transitions in synchronous communications. If BIAS transition is true, a determination is made as to the type of distortion to be added. If the MARK distortion parameter was invoked, the program finds the first occurrence of a BIAS transition and toggles the preceding trailing zeros to a logical 1 level by the percentage of distortion invoked by the operator. The program continues to sequentially search through the buffer toggling the preceding trailing 0's for each occurrence of a BIAS transition until the end of the buffer is encountered at which time the program terminates. The logical sequence for the other types of distortion are the same as the MARK-BIAS distortion with the exception that the leading 0's or the leading 1's or trailing 1's are toggled depending on the type of distortion parameters selected. It should be remembered that the microcode is controlling the microprocessor 10 which is adding the required distortion to the expanded bit pattern in response to the front panel parameters input by the operator. The input of parameters can be done a individual inputs or by invoking a function in the microcode that establishes a set of preprogrammed parameters.

Figure 4:
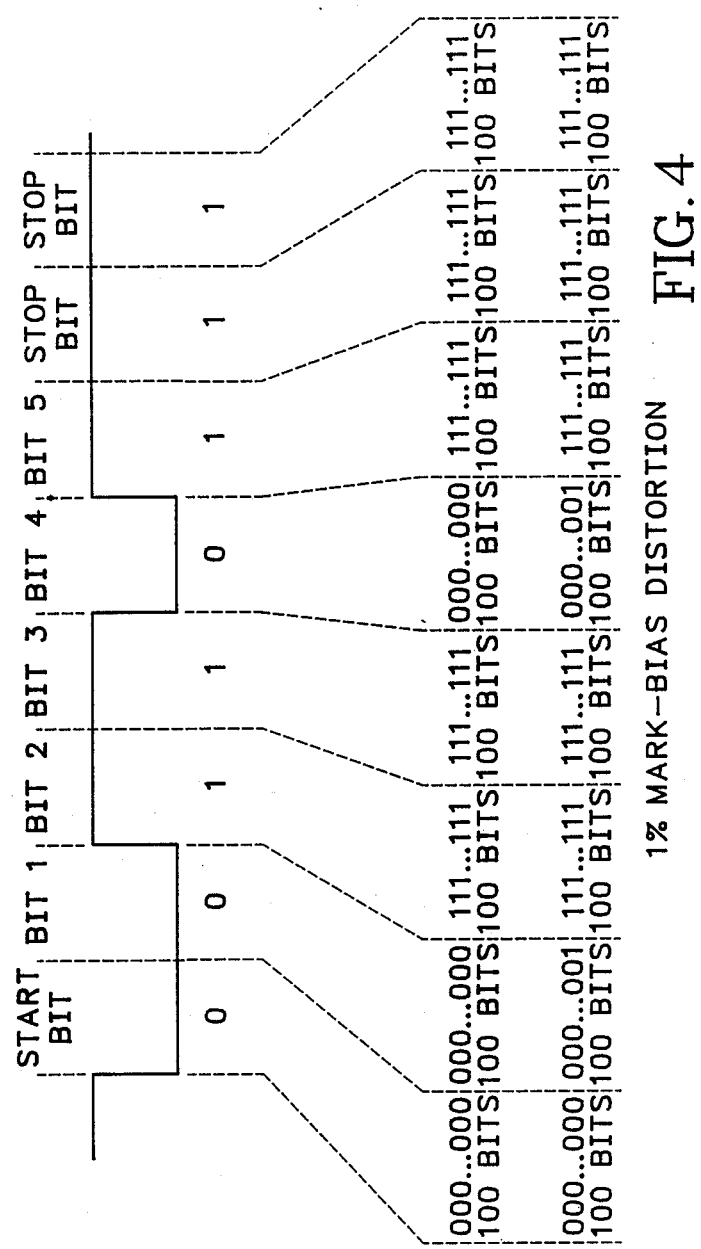
FIG. 4 is a representation of the expansion and distortion of a waveform bit pattern following the flow charts of FIGS. 3A-3B.

Referring to FIG. 4 where the waveform for FIG. 2(A) is reproduced, there is a graphical representation of the implementation of the microcode represented by the flow charts of FIGS. 3(A) and 3(B). Each bit of the eight bit pattern that is to be sent to the teletypewriter is expanded by 100. Selected bits are then toggled to the opposite logic level based on the parameters selected by the operator. In the figure, the last bit of bit 1 and bit 4 are toggled from a logical 0 to a logical 1. This represents a 1% MARK-BIAS distortion that is read out of RAM 18 to the serial I/O 22 and clocked out to the system under test as serial data at a rate equal to the integer multiple of expansion times the selected baud rate. Using a integer multiple of expansion of 100 and clocking the data out at one hundred times the baud rate will produce a distorted digital signal having a resolution of 1%. Higher or lower signal resolution can be achieved by respectively increasing or decreasing the integer multiple of expansion for each data bit.

A microprocessor controlled test system has been described in which a predetermined amount of distortion is added to a bit pattern representative of a character to be sent to a system under test. Under program control, the bit pattern is expanded by an integer multiple and then selected bits of the expanded bit pattern are toggled from a first logic level to another. The distorted expanded bit pattern is then clocked out of the test system at a rate equal to an integer multiple of expansion times the baud rate of the system under test. The resolution of the distorted digital signal can be varied by changing the integer multiple of expansion along with the rate at which the test signal is sent to the system under test. These and other aspects of the invention are set out in the appended claims.

I claim:

1. A method of generating and transmitting a distorted digital signal to a system under test having a known baud rate, the steps comprising:
    generating a bit pattern representative of input data to be sent to said system under test;
    expanding each bit of said bit pattern by an integer multiple to create an expanded bit pattern representative of said input data;
    toggling selected bits of said expanded bit pattern to create an altered expanded bit pattern representative of said input data with distortion added thereto; and
    transmitting said altered expanded bit pattern as said distorted digital signal to said system under test.

2. The method of claim 1 for generating and transmitting a distorted digital signal to a system under test wherein said step of generating said bit pattern representative of input data comprises the further steps of:
    receiving parameters for initiating a series of programmed steps to generate said bit pattern; and
    storing said generated bit pattern in a RAM memory.

3. The method of claim 1 for generating and transmitting a distorted digital signal to a system under test wherein said expansion of each said bit of said bit pattern by an integer multiple comprises the addition steps of:
    selecting the integer multiple by which each said bit of said bit pattern will be expanded;
    creating for each said bit of said bit pattern a like number of bits equal in number to said integer multiple; and
    storing in a RAM memory said created bit patterns forming said expanded bit pattern.

4. The method of claim 3 for generating and transmitting a distorted digital signal to a system under test wherein said step of toggling selected bits of said expanded bit pattern further comprises the steps of:
    determining a percentage of distortion to be added to said created bit patterns; and
    changing a portion of said created bit patterns to match said percentage of distortion forming said altered expanded bit pattern.

5. The method of claim 1 for generating and transmitting a distorted digital signal to a system under test wherein said step of transmitting said altered expanded bit pattern comprises the additional steps of:
    reading out from a RAM memory in parallel format said altered expanded bit pattern;
    converting said parallel formatted altered expanded bit pattern into serial data; and
    transmitting said serial data to said system under test at a rate equal to the baud rate of said system under test and said integer multiple.

* * * * *